United States Patent
Schmidt

[15] 3,689,063
[45] Sept. 5, 1972

[54] FILM SHEET ADVANCEMENT APPARATUS

[72] Inventor: Gunter Schmidt, Malibu, Calif.

[73] Assignee: Productron, Incorporated, Los Angeles, Calif.

[22] Filed: April 19, 1971

[21] Appl. No.: 135,102

[52] U.S. Cl. ........................ 271/51, 95/89 D, 95/94
[51] Int. Cl. ............................................. B65h 5/06
[58] Field of Search ................. 95/89 D, 94, 89 R

[56] References Cited

UNITED STATES PATENTS

| | | | |
|---|---|---|---|
| 2,927,503 | 3/1960 | Zollinger | 95/94 R X |
| 3,229,608 | 1/1966 | Staub et al. | 95/94 R |
| 3,301,158 | 1/1967 | Klem, Jr. et al. | 95/94 R |
| 3,366,025 | 1/1968 | Layne | 95/94 R |
| 3,413,904 | 12/1968 | Friedel | 95/94 R |

Primary Examiner—Samuel S. Matthews
Assistant Examiner—Richard M. Sheer
Attorney—Lindenberg, Freilich & Wasserman

[57] ABSTRACT

Apparatus for developing a film chip, including transport units for advancing a chip through tanks of processing chemicals and transfer units for receiving a film chip rising out of one transport unit and moving it over and down into the next transport unit in the next tank. Each transport unit includes several pairs of laterally spaced screws for engaging opposite edges of the film chip, so that as the screws rotate, the chip is slowly advanced along the tank. A raising wheel is positioned at one end of each screw to engage an edge of the film chip, the wheels rotating in directions to move the chip upwardly out of the tank. Each transfer unit includes a roller and a flat belt that moves in an endless path over the roller, so that a film chip is received between the roller and belt and is moved in an arc to the next tank.

13 Claims, 9 Drawing Figures

Patented Sept. 5, 1972

GUNTER SCHMIDT
INVENTOR.

BY
Lindenberg, Freilich & Wasserman
ATTORNEYS

Patented Sept. 5, 1972
3,689,063
4 Sheets-Sheet 2
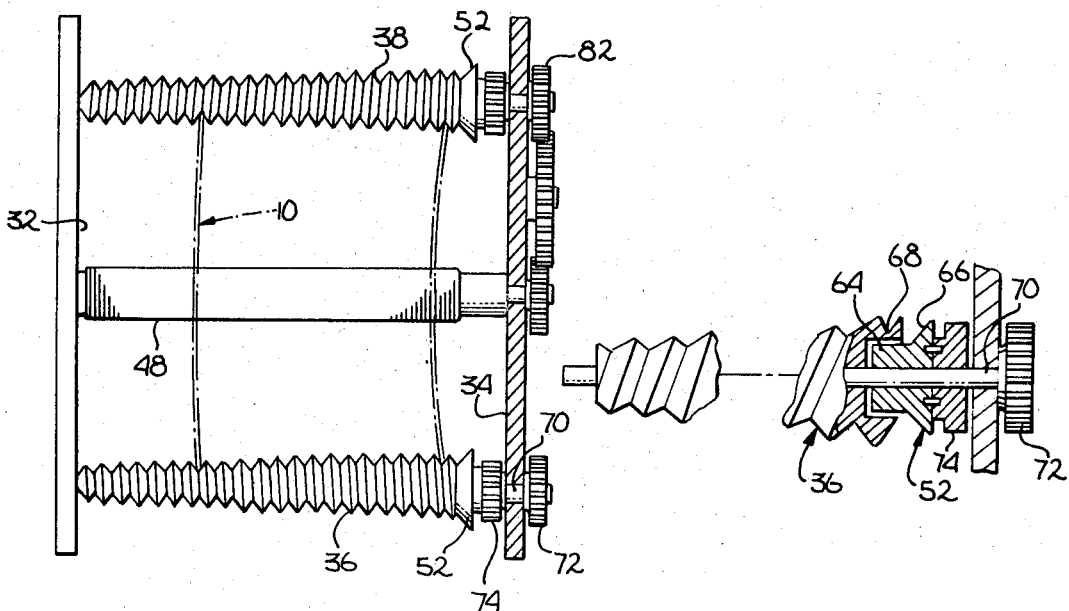
Fig. 3
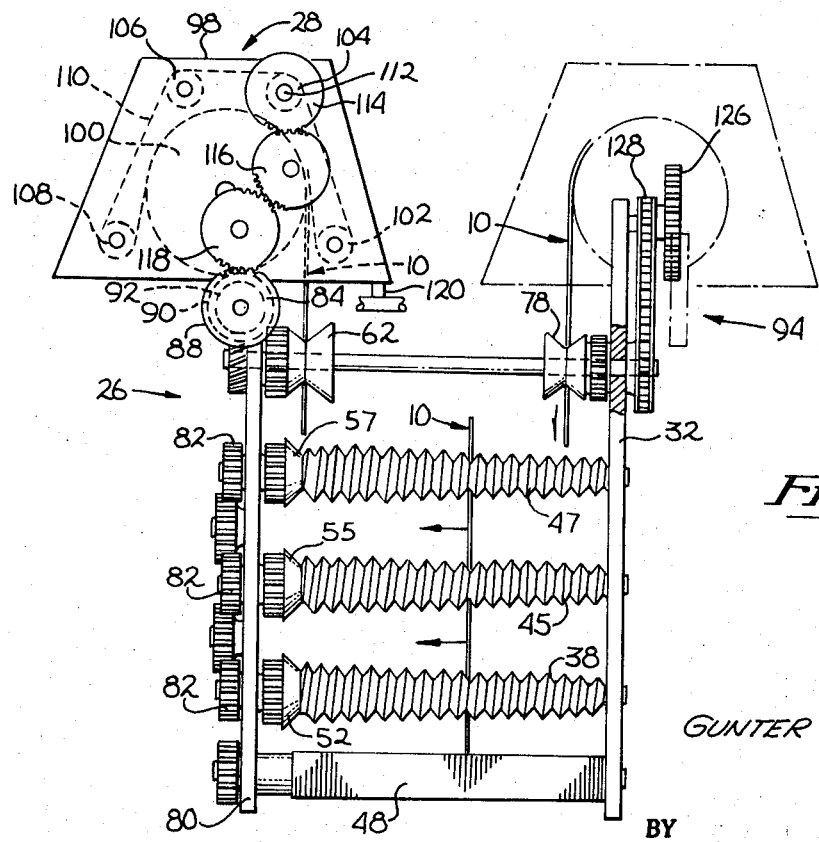
Fig. 4
Fig. 5
GUNTER SCHMIDT
INVENTOR.
BY
Lindenberg Freilich & Wasserman
ATTORNEYS

GUNTER SCHMIDT
INVENTOR.

BY
Lindenberg Freilich & Wasserman
ATTORNEYS

GUNTER SCHMIDT
INVENTOR.

BY
Lindenberg Freilich & Wasserman
ATTORNEYS

FILM SHEET ADVANCEMENT APPARATUS

BACKGROUND OF THE INVENTION

1. Field of the Invention

This invention relates to apparatus for processing sheets of photographic film and the like.

2. Description of the Prior Art dryer.

Sheets of photographic film, sometimes referred to as film chips in the case of smaller sizes, have recently gained increased importance, particularly for rapid-access record keeping. One type of machine for automatically developing film sheets includes one or more endless belts that extend into and out of successive tanks of processing chemicals and a dryer. Devices are attached to the belt to engage a film sheet so that it moves with the belt through the tanks and dryer.

In many cases, it is desirable to have a film chip remain for a relatively long period in the chemical tanks. For example, if the chemicals are used at room temperature or only moderately elevated temperatures, chemical actions are slower and longer immersion periods are required. Longer immersion periods can be provided by running the belt at a very low speed, but then the machine can process only a small number of film sheets per hour. The handling capacity can be increased by employing larger tanks so that the belt extends for longer distances in each tank, but this greatly increases equipment size and cost. Film processing apparatus which could maintain a film sheet in each processing tank for an extended period when desired, and yet which was compact, of high capacity, and relatively simple, would enable versatile and low cost film processing.

OBJECTS AND SUMMARY OF THE INVENTION

An object of the present invention is to provide a compact and high capacity sheet film processor, which can maintain each film sheet for a long period in each tank of processing chemicals.

Another object is to provide a transfer unit for a sheet film processor, which avoids damage to the film emulsion while squeegeeing off chemicals, in spite of wear and misalignment that may be present in the parts of the transfer unit.

In accordance with one embodiment of the invention, sheet film processing apparatus is provided which is compact, reliable, and of high capacity. The apparatus includes several sheet-transport units for reception in the different chemical tanks to advance the film sheets slowly through the tanks. Each transport unit includes pairs of laterally spaced screws for engaging opposite edges of the film sheet, so that as the screws are rotated the sheets slowly advance along the tank. A lifting wheel is mounted at one end of each screw and coaxially with it. While the screws rotate in directions to urge the sheet downwardly to maintain it in the tank as it moves therealong, the lifting wheels rotate in opposite directions to lift the sheet up out of the tank.

A transfer unit is provided between each set of transport units. The transfer unit receives a sheet moving out of one transport unit and carries it over and down into the next transport unit in the next tank. Each transfer unit includes a main roller positioned above the tanks, and an endless flat belt that extends in a path partially wrapped about the roller. A sheet rising out of one tank is received between the roller and flat belt so that chemicals on it are squeegeed off and a film sheet is carried over the roller and down into the next tank. The transfer unit is free of any squeeze rollers or the like that could press the belt against the main roller, so that the belt applies a force to the film sheet determined only by the belt tension. If there is a slight misalignment in the transfer unit parts, there is no danger that the film sheet will be pressed excessively hard between the belt and main roller which could cause damage to the film emulsion.

The novel features of the invention are set forth with particularity in the appended claims. The invention will be best understood from the following description when read in conjunction with the accompanying drawings.

BRIEF DESCRIPTION OF THE DRAWINGS

FIG. 3 is a view taken on the line 3—3 of FIG. 2;

FIG. 4 is a partial sectional view of a screw of the apparatus of FIG. 3;

FIG. 5 is a front elevation view of the film transport unit and transfer unit of FIG. 2;

DESCRIPTION OF THE PREFERRED EMBODIMENTS

Figure 1:
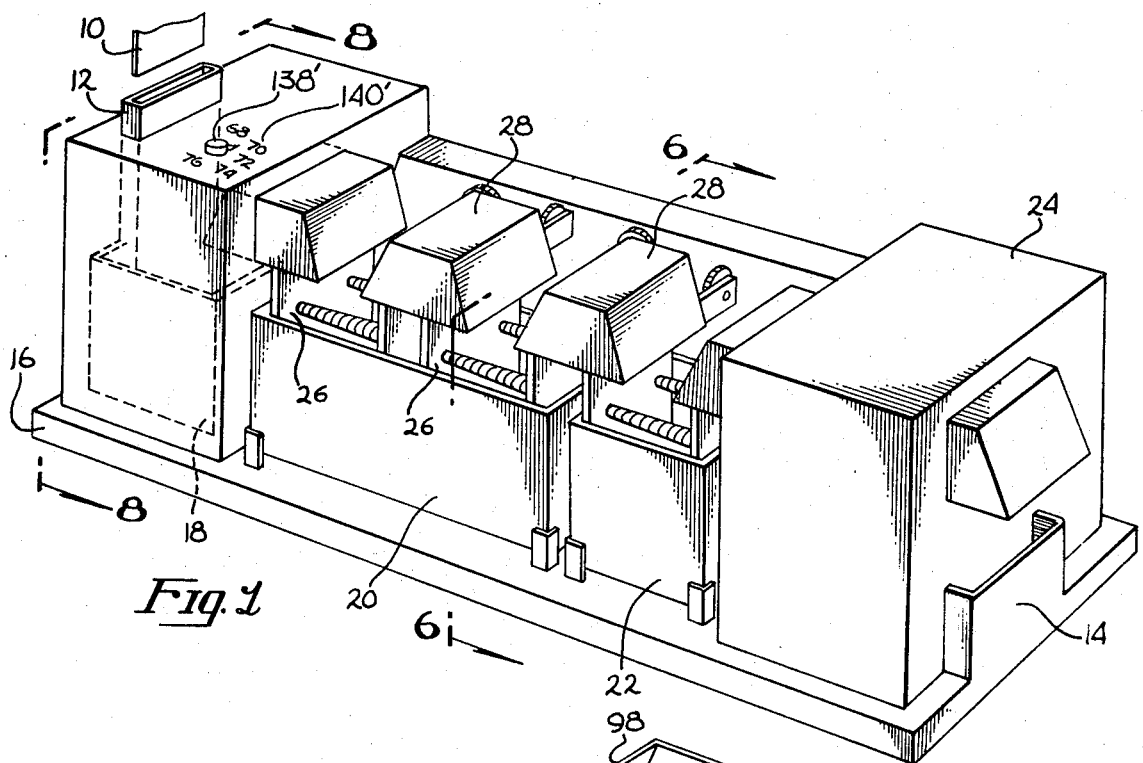
FIG. 1 is a perspective view of a film processing machine constructed in accordance with the invention.

FIG. 1 illustrates a processing machine which can receive a sheet of film, or film chip 10 at an input 12, and deliver the chip at an output box 14. The machine includes a machine frame 16 with several tanks 18, 20, 22 that hold processing chemicals such as a developer, hypo, and washing solution. A dryer unit 24 is positioned on the frame adjacent to the last tank 22. The processing apparatus includes several chip transport units 26 which can receive a film chip dropped therein, advance the chip slowly along the tank from one end to the other while the chip is immersed in the processing chemicals and raise the chip out of the tank so it can be transferred to the next unit. The machine also includes several transfer units 28, each designed to receive a film chip rising out of one transport unit and move the chip over and down into the next transport unit. It may be noted that one of the tanks 20 is shown containing two transport units 26, to allow a film chip to remain for a longer period in the tank. One or more transport units can be provided for each tank or other enclosure. Also, any number of transport and transfer units can be employed to enable the film chips to be moved through any desired number of tanks for more complex processes such as the development of color films.

Figure 2:
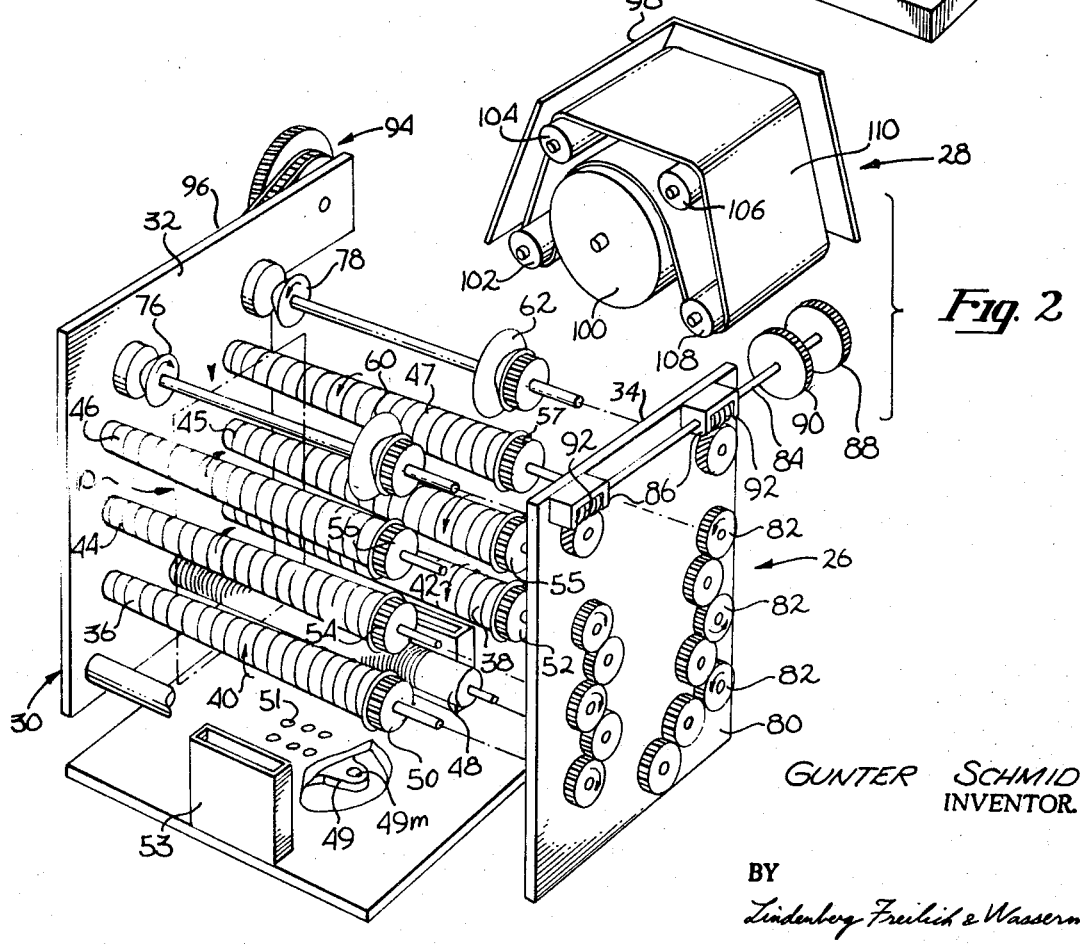
FIG. 2 is a perspective, exploded view of a film transport unit and transfer unit of the machine of FIG. 1.

FIG. 2 illustrates a transport unit 26 that moves a film chip slowly along a tank, and a transfer unit 28 that transfers the film chip to the next film transport unit. The transport unit 26 includes a frame 30 designed to be immersed in a tank of chemicals. The frame has an input end portion 32 where film chips are received and an output end portion 34 where film chips are delivered for movement into the next unit. Two screws 36, 38 are rotatably mounted on the frame and extend between the input portion 32 and output portion 34 thereof. These screws 36, 38 are laterally spaced by a distance sufficient to receive the film chip 10 between them. One of the screws 36 is right-handed and turns in the direction of arrow 40, while the other screw is left-handed handed and turns in the direction of arrow 42. Accordingly, as the screws 36, 38 rotate, the film chip 10 is slowly advanced between the input portion 32 and output portion 34 of the unit. It may be noted that the unit contains four additional screws 44-47 arranged in laterally spaced pairs, which operate in the same manner as screws 36, 38 to engage opposite edges of the film chip and move it along the unit. Of course, the additional set of screws 44-47 help to move the sheet in a stable manner.

The directions of rotation indicated by arrows 40, 42 result in the sides of the screws 36, 38 which are nearest each other and which engage the film sheet, moving with a downward directional component. Of course the other four screws rotate to also urge the film chip 10 downwardly. A support screw 48 is rotatably mounted near the bottom of the frame 30 to support the lower end of the film chip 10. The support screw 48 rotates at the same speed as the other six screws and has threads of the same pitch. However, the threads on the screw 48 are of much smaller depth and there are four parallel threads formed in the screw. Chemicals in the tank that holds the transport unit are constantly agitated by a rotor 49 with magnets 49m for remote driving, the rotor taking in fluid through holes 51 and pumping it out through conduits 53.

When a film chip reaches the output portion 34 of the unit, it should be raised out of the unit. The raising of the film chip is accomplished by several pairs of raising wheels mounted at the output ends of the screws. These include raising wheels 50 and 52 positioned at the output ends of the screws 36, 38, and additional raising wheels 54-57 at the outer ends of the other four screws 44-47. The wheel 50, which is coaxial with screw 36 rotates in a direction opposite to arrow 40, so that it tends to raise the film chip. The other raising wheels 54-57 operate in a similar manner. Accordingly, when a film chip has reached the outer ends of the screws, it tends to be raised upwardly out of the unit. A pair of additional raising wheels 60, 62 positioned above the other wheels further lift the film chip out of the unit.

FIG. 4 illustrates the construction of raising wheel 50 and shows its mounting with respect to the advancing screw 36. The raising wheel 50 has an inner face portion 64 nearest the screw 36 and an outer face portion 66 furthest from the screw 36. The inner face portion 36 has a diameter slightly less than the diameter of the screw 36 as measured at the minor diameter or deepest portion 68 of the threads at a location adjacent to the raising wheel 50. This allows the edge of a film chip that was engaged by the screw 36, to easily fall onto the narrow-diameter face portion 64 and remain engaged with it while resisting movement back onto the screw 36. The outer face portion 66 is beveled to retain the film chip edge. The screw 36 is fixed to a shaft 70 that is driven by a gear 72. The raising wheel 50 is freely rotatable on the shaft 70, and is fixed to another gear 74 that is driven to rotate the wheel 50 in a direction opposite to the direction of rotation of the screw 36.

All of the advancing screws 36, 38, and 44-47 are tapered in diameter, being narrowest at the input portion 32 of the frame and widest at the output portion 34. The reason for the tapering is to provide enough space between the screws at the input portion 32 to permit reception of a film chip, and to bow the film chip as it approaches the output portion 34 so that it can be securely engaged by the raising wheels. Thus, there is sufficient distance between the screws at the input portion 32 so that a film chip can be merely dropped between the screws. As the film chip approaches the output portion 34, it is bowed to an appreciable degree. When the edges of the film chip are engaged by the raising wheels such as wheels 50, 52, there is good engagement with the raising wheels and the chip can be reliably lifted out of the unit. Although all portions of the advancing screws 36, 38 and 44-47 may be tapered, it is only necessary that they be tapered at the minor diameter, or deepest part of their threads where the film edges lie.

In order to facilitate downward movement of a film chip at the input portion 32, the unit is provided with a pair of lowering wheels 76, 78. The lowering wheels 76, 78 rotate in the indicated directions to urge a film chip downwardly to a position between the screws. The wheels 76, 78 are V-shaped to better guide the film chip. Similarly, the raising wheels 60, 62 at the output portion of the unit are V-shaped to better guide the film chip that is held between them. The other raising wheels which lie coaxial with the advancing screws are not V-shaped, but are beveled only at one face portion since they must receive a film edge from the screw. Of course, instead of using a V-shaped for the wheels 60, 62, a concavely rounded rim or any other shape can be used which provide a concave region for trapping the edge of the film chip.

The numerous screws and wheels are rotated by transmission apparatus that includes numerous gears. The frame 30 of the advancing unit has an end plate 80 at the output portion 34 which supports numerous gears 82. A shaft 84 that is rotatably mounted on a pair of brackets 86 on the end plate, carries a pair of gears 88, 90 and a pair of screws or worms 92. Power is transmitted to the gear 88 by apparatus on the rest of the processing apparatus, as will be explained below. The gear 90 drives the transfer unit 28, as will also be described below. The worms 92 drive worm wheels that are engaged with the various gears 82 rotatably mounted on both sides of the end plate 80. The gears 82 rotate the six tapered advancing screws 36, 38 and 44-47, the supporting screw 48, and the eight raising wheels 50, 52, 54–57, 60, and 62. Another transmission assembly 94 mounted on an end plate 96 at the input portion 32 of the unit drives the lowering wheels 76, 78. Of course, it would be possible to drive the wheels 76, 78 from the worms 92.

The transfer unit 28 is mounted above the transport unit 26, to receive the film chip 10 as it is raised by the raising wheel 60, 62. The transfer unit moves the film chip in a loop so that it moves down into the sheet transport unit in the next succeeding tank of the processing apparatus. It may be noted that in some cases the next unit may be a dryer or the box following the dryer that holds the fully developed and dried chip. Most of the transfer units 28 are positioned at the output end of a chemical tank, and the transfer unit must also serve to squeegee off fluid on the film chip to minimize transfer of chemicals to the next unit.

The transfer unit 28 includes a frame 98, a main or carry roller 100 rotatably mounted on the frame, and four guide rollers 102, 104, 106, and 108, also rotatably mounted on the frame. A flat belt 110, preferably constructed of rubber or other elastomeric material extends in an endless path about the five rollers. The rollers 102, 108 guide the belt so that it is wrapped by almost 180° about the carry roller 100. The transfer unit is mounted so that a film chip being raised by the raising wheels 60, 62 of the transport unit is received between the carry roller 100 and the belt 110, at a location where the belt first enters onto the carry roller. As the belt 110 moves along the endless path over the rollers, the film chip is carried over the carry roller 100 to a position over the input portion of the next transport unit that may be located in the next tank. During reception of the upwardly moving chip between the carry roller and belt, droplets of fluid remaining on the chip are squeegeed out of it and fall back into the tank so that a minimum of processing fluid is carried by the chip into the next tank. As the chip leaves the carry roller 100, it is traveling in a downward direction and is engaged by the lowering wheels of the next transport unit.

The belt 110 of the transfer unit is driven along its endless path by the roller 104. As shown in FIG. 5, the roller 104 is fixed to a shaft 112 that extends beyond the frame or housing 98 of the transfer unit. A gear 114 is also fixed to the shaft. The gear 114 is engaged with an idler gear 116 which engages another idler gear 118. When the transfer unit 28 is mounted on the transport unit 26, the gear 118 is engaged with the gear 90 that is fixed to the same shaft as the gear 88. Several brackets 120 are provided to hold the transfer unit frame in place.

The belt 110 is installed on the five rollers so that there is a moderate tension in the belt. It is this belt tension that squeezes the film chip against the carry roller 100. If any of the five rollers are installed or moved out of position or alignment, the belt tension may be somewhat different at one side than at the other side. However, the squeezing force applied to the film chip as the belt presses it against the carry roller, will not become very high. This situation may be compared with transfer apparatus available heretofore wherein film was squeezed between two rollers, and wherein misalignment of the rollers or mounting of them too close together could result in excessive pressure on the film that damaged the film emulsion. The fact that the transfer unit of this invention is free of any pressure rollers or the like that press directly against the belt to hold it against the carry roller 100, eliminates this cause of film damage.

Figure 6:
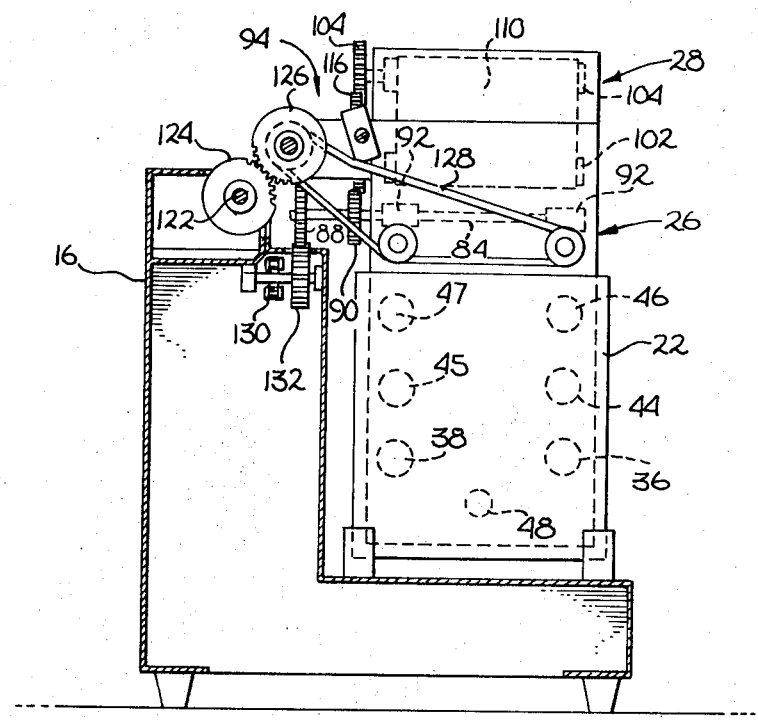
FIG. 6 is a view taken on the line 6—6 of FIG. 1.
Figure 7:
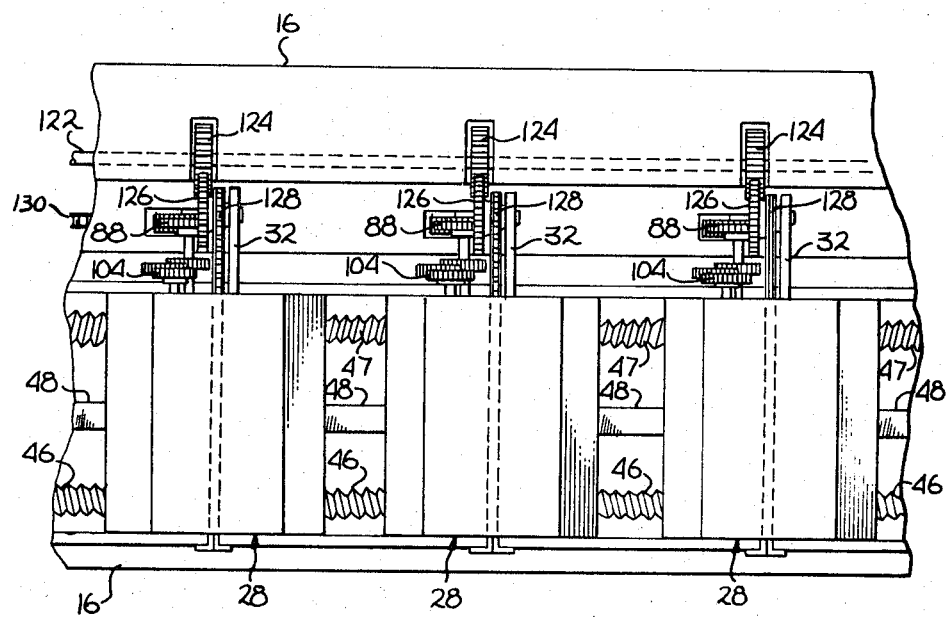
FIG. 7 is a partial plan view of the apparatus of FIG. 6.

FIGS. 6 and 7 show the manner in which power is transferred to a transport unit 26 from the rest of the processing machine. A main drive shaft 122 extends along the length of the machine frame 16 and carries drive gears 124 that are spaced therealong. The drive geat 124 engages a gear 126 of the transmission 96 of the transport unit 26 to rotate it. The gear 126 drives a chain 128 that carries power to wheels on one side of the transport unit 26. A main drive chain 130 which also extends along the length of the machine drives gears 132 that are rotatably mounted on the machine frame 16 at locations spaced along the frame. Each of the gears 132 drives a gear 88 on the transport unit 26, to rotate the screws and lifting wheels on the unit, as described above. When the transport unit 26 is first installed, it is engaged with the gears 124 and 132 by merely laying the transport unit in place so that its gears 126 and 88 engage a pair of gears 124, 132 on the machine frame. This allows for rapid removal and installation of a transport unit in the machine, with automatic engagement with one of the power take-off devices spaced along the machine.

Figure 8:
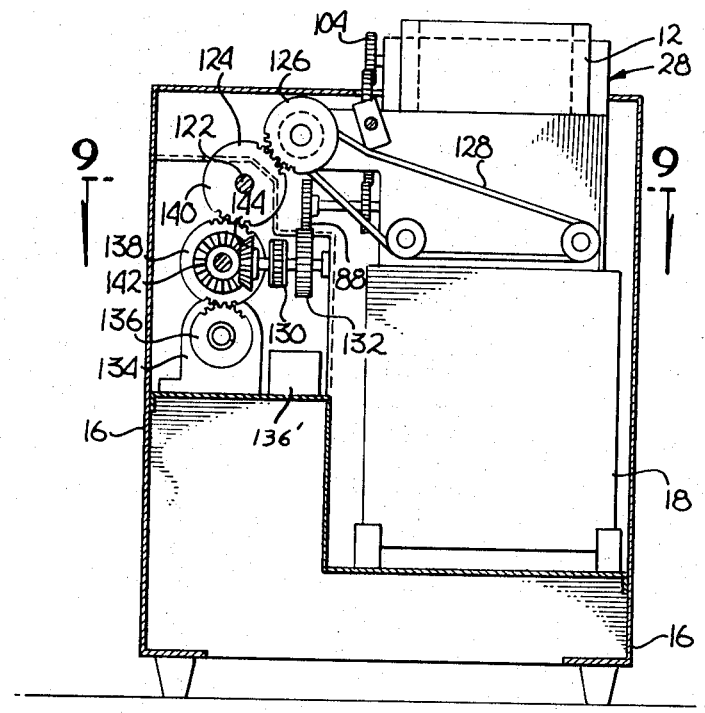
FIG. 8 is a view taken on the line 8—8 of FIG. 1.
Figure 9:
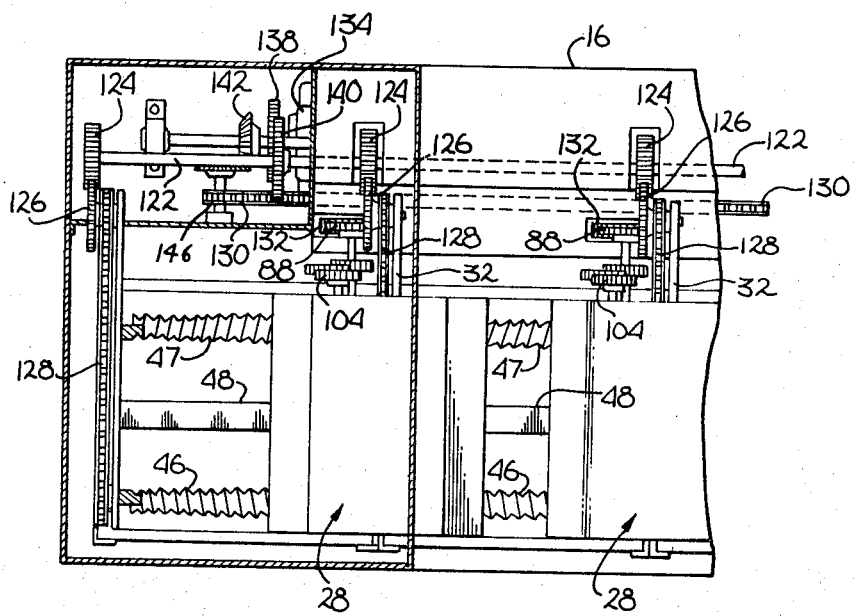
FIG. 9 is a view taken on the line 9—9 of FIG. 8.

As shown in FIGS. 8 and 9, the power transmitting shaft 122 and chain 130 that run along the length of the unit are driven by a motor 134 at one end of the frame. The motor 134 has a first gear 136 that drives an idling second gear 138 which drives a third gear 140 that is fixed to the shaft 122. The second gear 138 is fixed to a bevel gear 142 that drives another bevel gear 144, which drives a sprocket 146 about which the chain 130 is wrapped. The motor 134 is driven by an electronic speed control 136' which enables a moderate variation in motor speed, and therefore a moderate variation in the speed at which a film chip passes through various processing units of the machine. An operator can turn a knob 138' on top of the machine frame to vary the motor speed. A dial 140' (see FIG. 1) marked in degrees of ambient temperature is disposed about the knob 138'. The markings in degrees of ambient temperature are employed because the speed of the motor is generally chosen in accordance with the ambient temperature, as will be described below.

Film processing chemicals are generally maintained at a temperature above ordinary room temperatures in order to speed up the action of the chemicals on the film. In many cases, it is possible to develop a film using chemicals which are at ordinary room temperature, which is generally about 72° F, although the film generally must be maintained for a longer period in each chemical bath. In any case, slight changes in temperature of the processing chemicals generally means that the period of immersion must be changed if optimum results are to be achieved. By utilizing a dial 140' marked in degrees of ambient temperature, the operator merely has to set the speed controlling knob 138' at a position corresponding to the ambient temperature to choose the proper motor speed and therefore choose the proper duration of immersion of the film chip in the processing chemicals. Of course, the higher temperature markings on the dial 140' correspond to a higher motor speed. The increase in motor speed is generally not merely proportional to the increase in ambient temperature, but instead, the relationship is chosen to obtain the best results over the entire range of temperatures. The range may be limited, extending from perhaps 68° F to 76° F.

When the processing machine is employed with the processing chemicals at ambient temperature, each film chip must remain for a substantial period of time in each chemical tank. Even though the chip moves slowly through the tanks, the machine can still process film chips at a high rate. This is because the film chips are essentially "stacked" sidewardly in the chemical tank. That is, the film chips can be spaced from one another by only a small distance while they are held by the advancing screws in each advancing unit. The spacing must be sufficient so that the film chips are separated from one another as they are moved by the transfer unit 28. However, this still allows many chips to be held in each tank, so that film chips can be fed at short time intervals into the machine, and after the required processing time, they emerge at short intervals from the machine. The processing time may be long, such as over an hour, but the machine still can process many chips per hour. In some situations where the machine is set up with a large number of tanks, one or more of the tanks may have to be maintained at an elevated temperature while the rest of them can be maintained at room temperature. The machine is still simplified by the fact that only a limited number of heating jackets and temperature control systems are required.

The dryer unit 24 utilizes a transport unit 26 similar to those employed in the tanks of chemicals, to slowly advance a "stack" of film chips. The dryer blows heated air through the spaces between the chips to dry the chips The chips are then raised and a transfer unit similar to those employed between tanks moves the chips into the output box 14. The screw type transport therefore provides a compact and high capacity dryer for film sheets.

Thus, the invention provides film sheet processing apparatus which allows for high capacity processing in a compact and relatively simple machine. The machine is of modular design, with numerous identical transport units 26 and transfer units 28 that can be easily installed and removed. This allows the machine to be converted into use for different processing applications where different numbers of tanks may be required, and permits rapid replacement of defective transport and transfer units.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Film sheet moving apparatus comprising:
a frame;
a pair of screws rotatably mounted on said frame, said screws being laterally spaced and extending substantially parallel to each other to receive therebetween opposite edges of a film sheet in their threads;
a pair of wheels rotatably mounted on said frame at predetermined end portions of said screws and laterally spaced by approximately the same distance as said screws, said wheels located to engage therebetween the edges of said film sheet
means for rotating said screws to advance said film sheet towards said predetermined end portions of said screws; and
means for rotating said wheels to lift said film sheet.

2. The improvement described in claim 1 wherein:
each of said wheels is located coaxially with a different one of said screws, and each has an inner face portion adjacent to an end of the corresponding screw, said inner face portion having a diameter no greater than the screw diameter at the deepest part of the thread at said screw end, each wheel also having a greater diameter section at a region spaced from said inner face portion.

3. The improvement described in claim 2 including:
at least one pair of additional wheels spaced above said first mentioned pair of wheels at locations to engage opposite edge of said film sheet after it has been at least partially lifted by said first mentioned wheels, each of said additional wheels having a concave surface for receiving an edge of a film sheet; and
means for rotating said additional wheels to further lift said film sheet after it has been lifted by said first mentioned wheels.

4. Apparatus for moving a sheet of film comprising:
a frame having an input portion and an output portion;
a pair of elongated screws extending between said input and output portions and spaced from each other to hold a sheet of film between them, said screws being spaced from one another by a smaller distance at said output portion than at said input portion, as measured at their minor diameters, to bow the film sheet as it approaches said output portion:
a pair of sheet engaging means for carrying the film sheet between them, said sheet engaging means positioned at said output portion of said frame and spaced apart by approximately the same distance as said screws to engage the edges of the film sheet; and
means for rotating said screws to advance the sheet of film from said input portion to said output portion and for driving said sheet engaging means to move the sheet of film away form said screws.

5. The apparatus described in claim 4 wherein:
said screws are tapered in diameter.

6. The apparatus described in claim 4 wherein:
each of said sheet engaging means includes a wheel; and
said means for driving includes mans for rotating each wheel in a direction opposite to the direction of rotation of the screw which engages the same sheet edge.

7. Apparatus for moving a sheet of film comprising:
a frame having upper and lower portions;
a pair of laterally spaced screws rotatably mounted on said frame, one of said screws being right-handed handed and the other left-handed, each of said screws having a first end and said first end being substantially laterally spaced;
a pair of wheels, each rotatably mounted at the first end of a different screw; and
means for rotating said screws in opposite directions so that the sides nearest each other are moving primarily downwardly, and for rotating each of said wheels in a direction opposite to the direction of rotation of the screw whose end it lies at, so that the sides of said wheels nearest each other are moving primarily upwardly.

8. The apparatus described in claim 7 wherein:

said screws are mounted with the closest portions of their threads at the minor thread diameters thereof lying on imaginary lines that are spaced from one another at progressively smaller distances at locations progressively nearer said first ends of said screws, so that the space between said threads progressively decreases at decreasing distances from said first ends thereof where said wheels are mounted.

9. The apparatus described in claim 7 including;
transfer apparatus including a main roller, a belt, and a plurality of guide rollers, said belt extending in an endless path about said main roller and guide rollers, said transfer apparatus also including means for driving said belt around said endless path; and
means for mounting said transfer apparatus with a portion of said main roller where said belt first engages said main roller lying above said wheels at the end of said screw, whereby a sheet of film moved upwardly by said wheels is received between said belt and main roller.

10. In photographic processing apparatus wherein sheets of film are moved down into a chemical processing tank unit and up out of the tank unit for movement down into the next unit, the improvement comprising:
a carry roller:
frame means for rotatably mounting said carry roller above first and second of said chemical processing tank units;
a plurality of additional rollers rotatably mounted on said frame means;
an endless belt extending in an endless path about said carry roller and additional rollers, so that a sheet of film rising out of the first tank unit is received between said belt and carry roller;
each of said additional rollers being spaced from said carry roller by a distance greater than the thickness of said belt, so that a film sheet is pressed against said carry roller only by the tension in said belt;
a pair of screws extending along the first tank unit, said screws mounted to rotate about their axes and spaced from one another to receive said film sheet between them; and
a plurality of pairs of wheels mounted at one end of said screws for receiving the film sheet between them to lift it out of the first tank unit and insert it between said belt and carry roller.

11. Apparatus for moving sheets of film comprising:
a frame having a region for holding a series of tanks;
a plurality of power take-off means along said frame;
a plurality of sheet transport units for reception in the tanks, each unit including a pair of spaced members for reception in the lower portion of a tank with the spaced members having recesses for engaging the edges of a sheet to carry it between them, first transmission means for driving said spaced members to advance the recesses thereof and the sheet engaged in them along the tank, the recesses which engage the opposite edges of the sheet being laterally spaced from each other in a direction substantially perpendicular to the direction in which they are moved by said first transmission means, means for raising the sheet of film from between said members upwardly out of said tank, and means for engaging at least one of said power take-off means to transmit power to said first transmission means;
a transfer unit; and
means for holding said transfer unit over a pair of said sheet transport units for transferring the film sheet from one sheet transport unit to another.

12. The apparatus described in claim 11 wherein:
each of said members includes a screw; and
said means for raising the sheet upwardly out of said tank includes a pair of spaced wheels engaging the edges of the sheet.

13. The apparatus described in claim 11 wherein:
said transfer unit includes a carry roller, an endless belt, means having belt engaging surfaces for guiding said belt in a path that wraps partially about said carry roller, all belt-engaging surfaces of said means for guiding said belt being spaced from said carry roller by a distance greater than the thickness of said belt so that the pressure of said belt on said carry roller is determined only by belt tension, and means for driving said belt, said carry roller positioned
to receive the sheet facewise between it and said belt.

* * * * *